United States Patent
Kornilovich et al.

(10) Patent No.: US 7,375,458 B2
(45) Date of Patent: May 20, 2008

(54) CONTINUOUS CARBON-NANOTUBE FILAMENTS FOR RADIATION-EMITTING DEVICES AND RELATED METHODS

(75) Inventors: Pavel Kornilovich, Corvallis, OR (US); James Stasiak, Lebanon, OR (US); Robert Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 10/900,844

(22) Filed: Jul. 28, 2004

(65) Prior Publication Data

US 2006/0022568 A1 Feb. 2, 2006

(51) Int. Cl.
*H01J 1/88* (2006.01)

(52) U.S. Cl. ............. 313/271; 313/272; 313/273; 313/627

(58) Field of Classification Search ......... 313/271
See application file for complete search history.

(56) References Cited

U.S. PATENT DOCUMENTS

| | | |
|---|---|---|
| 6,426,590 B1 | 7/2002 | Chung et al. |
| 6,740,224 B1 * | 5/2004 | Benavides et al. ......... 205/615 |
| 2003/0205966 A1 | 11/2003 | Chen et al. |
| 2004/0051432 A1 * | 3/2004 | Jiang et al. ............ 313/311 |

OTHER PUBLICATIONS

The American Heritage (R) Dictionary of the English Language, Fourth Edition: Copyright (C) 2000 by Houghton Mifflin Company; Definition of Carbon Nanotube.*
Weiss; Tiny Tubes Brighten Bulbs: Nanotubes beat tungsten in lightbulb test-maybe; Jun. 5, 2004; vol. 165, No. 23, p. 356; Science New s Online.
"Simulation of double-wall carbon nanotube melting"; http://www.pa.msu.edu/cmp/csc/simtubemlt.html.; printed Jul. 27, 2004.
Wei, Jinquan et al., "Carbon nanotube filaments in household light bulbs," Applied Physics Letters, vol. 84, No. 24, Jun. 14, 2004, pp. 4869-4871.
Jiang, K. et al., "Spinning continuous carbon nanotube yarns," Nature, vol. 419, Oct. 24, 2002, pp. 801.
Li, Peng et al., "Polarized incandescent light emission from carbon nanotubes," Applied Physics Letters, vol. 82, No. 11, Mar. 17, 2003, pp. 1763-1765.
Zhu; "Direct synthesis of long single walled carbon nanotube strands"; Science, vol. 296, No. 5569, May 3, 2002; pp. 884-886.
Ya-Li Li; "Direct Spinning of carbon nanotube fibers . . . "; Science, vol. 304, No. 5668, Apr. 9, 2004; pp. 276-278.
Demczyk; "Direct mechanical measurement of the tensile strength and elastic . . . "; Materials Science and Engineering, vol. 334, No. 1-2, Sep. 2002; pp. 173-178.
JP 2005-100757; Patent Abstracts of Japan vol. 2003, No. 12, Dec. 5, 2003.

* cited by examiner

*Primary Examiner*—Joseph Williams
*Assistant Examiner*—Hana A Sanei

(57) ABSTRACT

This disclosure relates to continuous carbon-nanotube filaments of radiation-emitting devices and methods for fabricating them.

37 Claims, 3 Drawing Sheets

CONTINUOUS CARBON-NANOTUBE FILAMENTS FOR RADIATION-EMITTING DEVICES AND RELATED METHODS

TECHNICAL FIELD

This invention relates to filaments for radiation-emitting devices.

BACKGROUND

Incandescent light sources are brighter and more efficient the closer their temperature is to 6500 K (about 6200 degrees Celsius). At this temperature, the human eye can see in the form of visible light about forty percent of the energy expended by the source. This is the maximum amount of energy visible from an incandescent light source.

Solid, man-made incandescent light sources can not operate at this brightness and efficiency, however. This is because solid materials cannot be heated to 6500 K (the surface of the sun is 6500 K, but it is made up of plasma, not solid materials).

Various notable scientists and engineers have struggled to determine what solid material makes the best light source. In 1800, Humphry Davy invented the first electric light but it had a very short lifespan. Much later, physicist Sir Joseph Swan (c. 1860) developed a longer-lasting electric light with a carbon paper filament. Unfortunately, Sir Swan's design also had a short lifespan. Thomas Edison later developed (c. 1879) a filament made of carbon black (elemental, simple carbon) coated over a piece of string. His early design lasted 40 hours in an oxygen-free bulb. Lewis Latimer, a member of Edison's research team, later patented a method for manufacturing carbon filaments in 1881. Carbon-coated filaments, however, were ultimately found to be inadequate because of their low reliability and low operating temperature.

William Coolidge (c. 1910) later used tungsten filaments. Tungsten filaments were found to have a longer lifespan than Edison's carbon-coated filaments. Tungsten has the second-highest melting point of any material, about 3700 K, allowing it to be heated to a high temperature. Tungsten, however, is not capable of being heated to near 3700 K without rapidly failing. It, like most materials, vaporizes at a faster rate the closer its temperature is to its melting point. Because of this, there is a trade off between a material's efficiency, which is enabled by high-temperature operation, and its lifespan. Many currently used tungsten-filament devices operate at a temperature of about 2800 K to give them an acceptable lifespan and efficiency. At this temperature they are about ten percent efficient—about ten percent of the energy expended is visible to the human eye.

The lifespan of a filament can also depend on the filament's structure. If a filament has a polycrystalline structure, for instance, there may be localized heating at the crystal boundaries. Localized heating increases the temperature around the crystal boundaries, causing these areas to fail more quickly, such as by melting or vaporizing faster due to their higher temperature. Tungsten filaments often have a polycrystalline structure, which can limit their lifespan.

There is, therefore, a need for radiation and/or incandescent light-emitting devices having a higher efficiency and/or longer lifespan.

BRIEF DESCRIPTION OF THE DRAWINGS

The same numbers are used throughout the disclosure and figures to reference like components and features.

DETAILED DESCRIPTION

Overview

This document discloses radiation- and light-emitting devices having a continuous carbon-nanotube filament. Some of these filaments have a high mechanical strength, allowing devices incorporating them to have long life, high efficiency, and be heated to a high operating temperature. Alternately or additionally, the filaments have few areas of localized heating, also enabling long life and high efficiency.

Carbon Nanotubes

Generally, carbon nanotubes are strong and have a high boiling point and few impurities. This high boiling point has been simulated to be up to or more than about 4000 K by David Tomanek. (See Tomanek et al. at http://www.pa.ms-u.edu/cmp/csc/simtubemlt.html.) This high boiling point enables carbon nanotubes to efficiently transform energy into visible light, as well as ultra-violet radiation. Carbon nanotubes' few impurities and high strength can enable them to survive high temperatures for a relatively long time.

A discontinuous structure of carbon nanotubes, however, does not take full advantage of some of these attributes. A discontinuous structure of carbon nanotubes is generally weaker than a continuous structure. As such, a filament having a discontinuous structure can have a lower energy efficiency and lifespan than a filament having a continuous one.

Similarly, while carbon nanotubes generally have few impurities and thus few regions of localized heating, a discontinuous structure of carbon nanotubes can inherently have many regions of localized heating even if the carbon nanotubes in the discontinuous structure have few impurities.

Figure 1:
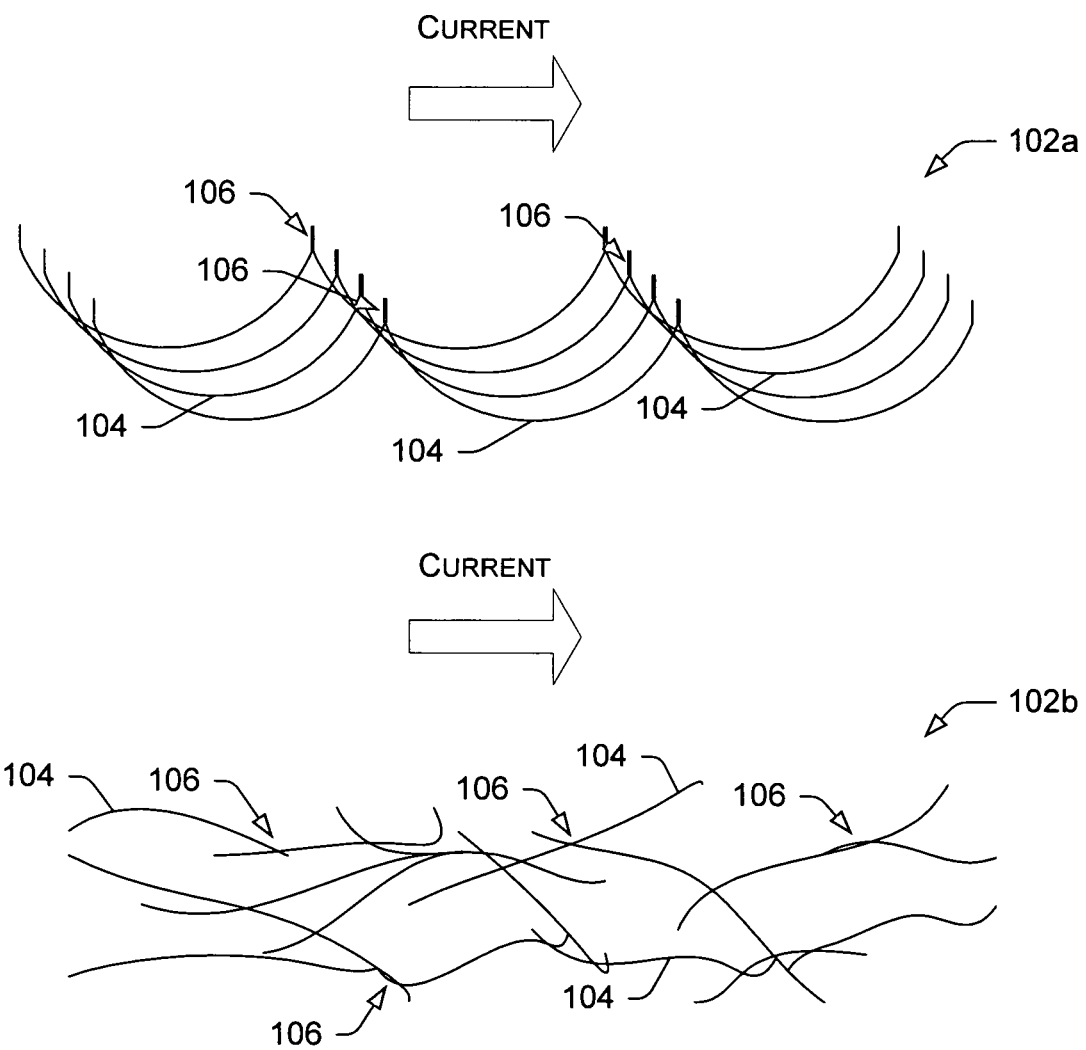
FIG. 1 illustrates two discontinuous carbon-nanotube filaments.

Referring to FIG. 1, two discontinuous carbon-nanotube filaments 102a and 102b are shown. Filament 102a has a yarn structure, with each carbon nanotube 104 touching end-to-end with other carbon nanotubes 104. Filament 102b has a substantially randomly oriented fabric structure, with each nanotube 104 touching the other nanotubes at generally random points along each nanotube's elongate axis. Both of the discontinuous filaments have areas of localized heating at regions of discontinuity 106. At these regions, a current (marked "Current") traveling through the discontinuous filament encounters a higher resistance. This resistance causes the discontinuous region to be heated to a higher temperature. The higher temperature in these discontinuous regions causes faster vaporization or melting, thereby reducing the filament's life and/or efficiency.

Forming Continuous Carbon-Nanotube Filaments

Figure 2:
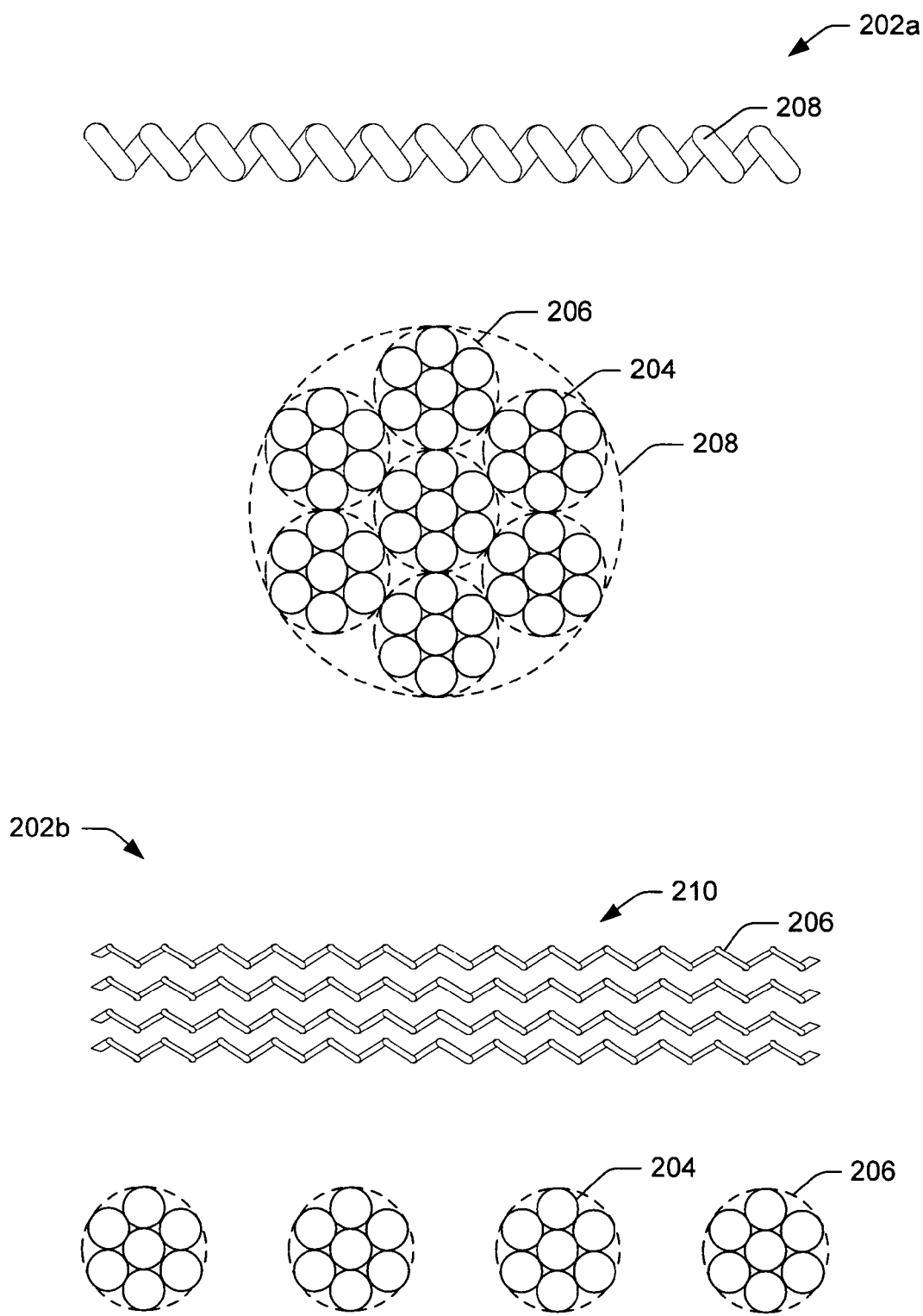
FIG. 2 includes top-plan and clipped-plane views of two continuous carbon-nanotube filaments.

Referring to FIG. 2, a continuous carbon-nanotube filament 202 (202a and 202b) is formed from carbon nanotubes 204. The carbon nanotubes are oriented continuous from one end of the filament to the other. By so doing, the filament has a high mechanical strength. In the illustrated embodiment, the filament has a tensile strength of about 150 GPa, which is about 375 times stronger than steel. The illustrated filament also has a Young's modulus of about 1100-1200 GPa, compared with steel's 208 GPa per cross-sectional area. This high mechanical strength can enable higher operating temperatures and thus a higher-efficiency and longer-lasting light-emitting device. This continuity of the carbon nanotubes also enables extremely few regions of localized heating, thereby also permitting a more efficient and/or longer-lasting device.

In one illustrated embodiment, filament 202a comprises a twisted rope structure. This structure, shown in top-plan and expanded clipped-plane cross-sectional views, has micro coils 206 of the nanotubes 204 wrapped together. These micro coils 206 are wrapped into larger, macro coils 208.

In another illustrated embodiment shown in FIG. 2, filament 202b comprises a substantially planar structure. This planar structure, shown in top-plan and expanded clipped-plane cross-sectional views, has micro coils 206 of the nanotubes 204 wrapped together. These micro coils are arranged into a planar array 210. The planar array illustrated has four micro coils, but in other embodiments can have many hundreds or thousands of micro coils. This planar array enables improved two-dimensional focus when a light-emitting device having this array is used in a projection system. In this embodiment, the micro coils 206 have a thickness of about thirty nanometers, which permits the planar array to have an overall thickness as little as about thirty nanometers if the micro coils are substantially uncoiled or straight. If not, the planar array can have a larger overall thickness based on how much the micro coils are coiled, such as about sixty nanometers for tightly coiled micro coils.

In the illustrated embodiments, the filament is made predominantly of conductive carbon nanotubes. Carbon nanotubes are formed and then separated in accordance with their conductivity. Specifically, carbon nanotubes can be resistive, semiconductive, and highly conductive. Highly conductive carbon nanotubes include those that exhibit metallic properties. In this embodiment, the filament is made up predominantly of highly conductive, semiconductive, or a mix of both of these types of carbon nanotubes.

The carbon nanotubes used in the filament can be of various sizes, such as having a diameter of about one to eleven nanometers and a length of about one millimeter to one centimeter. In one embodiment, the nanotubes are packed with fullerenes creating a pea pod structure. The nanotubes have carbon spheres (fullerenes) packed inside their walls. To do so, the nanotubes have a diameter slightly larger than the diameter of the fullerenes. In one embodiment, the carbon nanotubes have a diameter of about one nanometer and are packed with fullerenes having a diameter of about 0.8 nanometers.

Forming the Device

Figure 3:
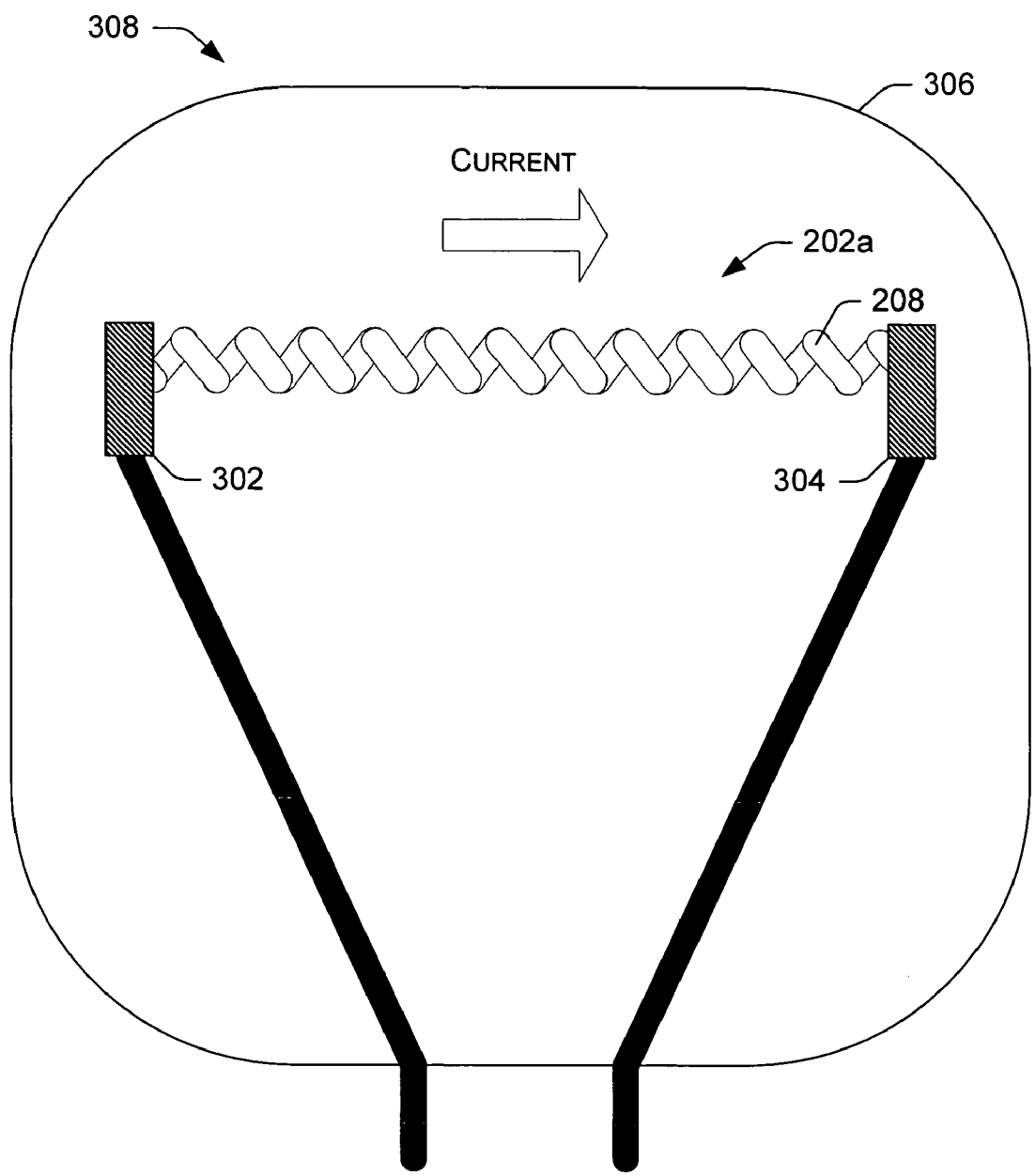
FIG. 3 includes a light-emitting device with a continuous carbon-nanotube filament.

Referring to FIG. 3, the continuous carbon-nanotube filament 202 is oriented in electrical communication with electrical contacts 302 and 304, such as by clamping ends of the filament at the contacts.

The filament and the contacts are disposed in an encapsulant capable of maintaining a controlled atmosphere. In the illustrated embodiment, the filament and contacts are encapsulated within a bulb 306 having an argon atmosphere at a pressure of about 0.8 atmospheres (i.e., about 12 pounds per square inch). Other controlled atmospheres may also be used, such as a vacuum or a xenon atmosphere. The resulting light-emitting device 308 is capable of emitting light through the filament by passing a current through the contacts and the filament.

The continuity of the carbon nanotubes 204 in the filament 202 (shown in FIG. 2 as 202a and 202b) enables fewer regions of localized heating 106 (shown in FIG. 1). Thus, not only is the filament made of a material capable of high temperature and high mechanical strength, it is structured to take advantage of the material's capabilities. The filament 202 is structured through its continuity to have high mechanical strength and few regions of localized heating. These few regions of localized heating and high strength enable the device 308 to be operated at higher temperatures or with a higher lifespan.

By way of example, the device 308 is capable of an energy efficiency of about twelve or more percent with a lifespan of about 1000-2400 hours (depending on a halogen composition in the bulb). This is enabled by the filament 202 being heated to a temperature of about 3100 K. This is about a twenty percent improvement in energy efficiency and brightness over many tungsten-filament incandescent lights. Efficiencies above twelve percent are also possible. In another embodiment, for instance, the device 308 is capable of an efficiency of about fifteen percent with a lifespan of about 1000-2400 hours by the filament being heated to about 3500 K. The device may also be capable of an efficiency of about twenty percent with a lifespan of about 1000-2400 hours, if the filament is heated to about 4000 K.

Also by way of example, the device 308 is capable of an energy efficiency of about ten percent with a lifespan of about 2400 hours. In another embodiment, the device 308 is capable of this efficiency with a lifespan of about 10000 hours. These long lifespans are enabled by the filament being heated to a temperature of about 2800 K but with a slow rate of failure. These lifespans are about a twenty to 500 percent improvement over the current lifespan of many tungsten-filament incandescent lights.

The device 308 is also capable of gradual, rather than catastrophic failure. The carbon nanotubes 204 of FIG. 2 act in the device as many parallel conductors. Thus, as one fails, the resistance of the filament 202 increases marginally, thereby marginally dropping the current. Because of this, the brightness of the device drops a very small amount with each nanotube's failure. In some incandescent light devices, a failure at one point in a filament causes a catastrophic failure, such that the entire filament fails. This can cause a light-emitting device to instantly fail. The illustrated device 308, however, gradually dims, thereby allowing a user to change the device at his or her convenience whenever the device is dimmer than needed.

Although the invention is described in language specific to structural features and methodological steps, it is to be understood that the invention defined in the appended claims is not necessarily limited to the specific features or steps described. Rather, the specific features and steps disclosed represent exemplary forms of implementing the claimed invention.

What is claimed is:

1. A device comprising:
    a carbon-nanotube filament spanning approximately an entire length of the device, the filament being formed of an array of carbon-nanotubes, where a length of a carbon-nanotube is approximately equal to a length of the filament, and where the array of carbon-nanotubes are arranged such that approximately the entire lengths of each carbon-nanotubes are adjacent;

electrical contacts in electrical communication with the filament; and an encapsulant encapsulating the filament and electrical contacts, the encapsulant providing a controlled atmosphere, wherein the filament is configured to emit radiation when an electric current is passed between the electrical contacts and through the filament.

2. The device of claim 1, wherein the filament predominantly comprises highly conductive carbon nanotubes.

3. The device of claim 1, wherein the filament predominantly comprises semiconductive carbon nanotubes.

4. The device of claim 1, wherein the filament predominantly comprises highly conductive and semiconductive carbon nanotubes.

5. The device of claim 1, wherein continuous carbon nanotubes of the filament are packed with fullerenes.

6. The device of claim 1, wherein the filament has a tensile strength of at least 150 GPa.

7. The device of claim 1, wherein the filament has a twisted rope structure.

8. The device of claim 1, wherein the filament has a substantially planar structure.

9. The device of claim 8, wherein the planar structure has a thickness of less than or about sixty nanometers.

10. The device of claim 8, wherein the planar structure comprises a planar array of micro-coiled carbon nanotubes.

11. The device of claim 1, wherein the filament emits light at an efficiency of about twelve or more percent for 2000 hours.

12. The device of claim 1, wherein the filament emits light at an efficiency of about ten or more percent for about 2400 hours.

13. The device of claim 1, wherein the filament emits light at an efficiency of about ten or more percent for about 10000 hours.

14. A system comprising:
a carbon-nanotube filament for emitting light at an efficiency of about twelve or more percent for a lifespan of about 2000 hours, where the filament spans approximately an entire length of a light-emitting device and is formed of an array of carbon-nanotubes, where a length of a carbon-nanotube is approximately equal to a length of the filament, and where the array of carbon-nanotubes are arranged such that approximately the entire lengths of each carbon-nanotubes are adjacent; and
an encapsulant for encapsulating the carbon nanotube filament.

15. The system of claim 14, wherein the carbon nanotubes are predominantly continuous between opposing ends of an elongate axis of a filament.

16. The system of claim 14, wherein the efficiency is about fifteen or more percent.

17. The system of claim 14, wherein the lifespan is about 2400 or more hours.

18. A method comprising:
providing a structure with a structure length approximately equal to a light-emitting device length and having an array of carbon nanotubes, where a length of a carbon-nanotube is approximately equal to a length of the structure, and where the array of carbon-nanotubes are arranged such that approximately the entire lengths of each carbon-nanotubes are adjacent;
orienting the ends of the structure in electrical communication with electrical contacts; and
encapsulating the structure and the electrical contacts within an inert atmosphere.

19. The method of claim 18, wherein the structure is elongate along the axis.

20. The method of claim 18, wherein the act of providing the structure comprises providing the structure having substantially all of the carbon nanotubes being continuous between the opposing ends.

21. A method comprising:
providing carbon nanotubes having a length of at least about one millimeter;
separating the carbon nanotubes into at least conductive and resistive nanotubes; and
forming a carbon-nanotube filament having a length approximately equal to a light-emitting device length from the conductive nanotubes, where the length of the carbon-nanotube is approximately equal to a length of the filament and where the conductive carbon-nanotubes are arranged such that approximately the entire lengths of each conductive carbon-nanotubes are adjacent.

22. The method of claim 21, wherein the act of separating comprises separating the carbon nanotubes into highly conductive, semiconductive, and resistive nanotubes.

23. The method of claim 22, wherein the act of forming comprises forming the filament from the highly conductive nanotubes.

24. The method of claim 22, wherein the act of forming comprises forming the filament from the semiconductive nanotubes.

25. The method of claim 21, wherein the act of forming the filament comprises forming the conductive nanotubes into a twisted rope structure.

26. The method of claim 21, wherein the act of forming the filament comprises forming the conductive nanotubes into a planar array.

27. The method of claim 26, further comprising orienting the filament within a projection system.

28. The method of claim 21, wherein the act of forming the filament comprises forming the conductive nanotubes into micro coils.

29. The method of claim 21, further comprising packing the conductive nanotubes with fullerenes.

30. The method of claim 21, further comprising forming an incandescent light-emitting device with the filament.

31. A filament comprising macro coils of carbon-nanotube micro coils formed of carbon-nanotubes arranged such that approximately entire lengths of each carbon-nanotubes are adjacent, and where a length of the filament is approximately equal to both a light-emitting device length and a length of a carbon-nanotube micro coil.

32. The filament of claim 31, wherein carbon nanotubes of the carbon-nanotube micro coils are packed with fullerenes.

33. The filament of claim 31, wherein the filament has a tensile strength of at least 150 GPa.

34. The filament of claim 31, wherein the filament has a twisted rope structure.

35. A substantially planar filament comprising an assembly of continuous carbon-nanotube micro coils formed of carbon-nanotubes arranged such that approximately entire lengths of each carbon-nanotubes are adjacent, and where a length of the filament is approximately equal to both a light-emitting device length and a length of a carbon-nanotube micro coil.

36. The filament of claim 35, wherein carbon nanotubes of the carbon-nanotube micro coils are packed with fullerenes.

37. The filament of claim 35, wherein the carbon-nanotube micro coils have a thickness of less than or about sixty nanometers.

* * * * *